(12) United States Patent
Doshi et al.

(10) Patent No.: US 8,234,365 B2
(45) Date of Patent: Jul. 31, 2012

(54) METHOD AND SYSTEM OF ALERT NOTIFICATION

(75) Inventors: Rutvik Doshi, Framingham, MA (US); Kartik Shankaranarayanan, Framingham, MA (US); Saurav Mohapatra, Framingham, MA (US)

(73) Assignee: CA, Inc., Islandia, NY (US)

( * ) Notice: Subject to any disclaimer, the term of this patent is extended or adjusted under 35 U.S.C. 154(b) by 1149 days.

(21) Appl. No.: 11/036,087

(22) Filed: Jan. 14, 2005

(65) Prior Publication Data

US 2005/0216781 A1 Sep. 29, 2005

Related U.S. Application Data

(63) Continuation of application No. 10/813,376, filed on Mar. 30, 2004, now abandoned.

(60) Provisional application No. 60/460,208, filed on Apr. 4, 2003, provisional application No. 60/460,467, filed on Apr. 4, 2003, provisional application No. 60/460,258, filed on Apr. 4, 2003.

(51) Int. Cl.
*G06F 15/173* (2006.01)
*G06F 15/16* (2006.01)

(52) U.S. Cl. ........................................ 709/224; 709/203

(58) Field of Classification Search .................. 709/203, 709/224, 229, 232
See application file for complete search history.

(56) References Cited

U.S. PATENT DOCUMENTS

| | | | | |
|---|---|---|---|---|
| 5,655,081 A * | 8/1997 | Bonnell et al. | ................. | 709/202 |
| 6,442,694 B1 * | 8/2002 | Bergman et al. | ................. | 726/22 |
| 6,934,756 B2 * | 8/2005 | Maes | ............................ | 709/227 |
| 7,177,929 B2 * | 2/2007 | Burbeck et al. | ................. | 709/224 |
| 7,243,130 B2 * | 7/2007 | Horvitz et al. | ................. | 709/207 |
| 7,302,634 B2 * | 11/2007 | Lucovsky et al. | ................. | 707/10 |
| 7,376,969 B1 * | 5/2008 | Njemanze et al. | ................. | 726/22 |
| 7,509,304 B1 * | 3/2009 | Pather et al. | ....................... | 707/3 |
| 2003/0041093 A1 | 2/2003 | Yamane et al. | ................. | 709/201 |
| 2003/0126136 A1 * | 7/2003 | Omoigui | .......................... | 707/10 |
| 2003/0226109 A1 * | 12/2003 | Adamson et al. | .............. | 715/513 |
| 2004/0054690 A1 * | 3/2004 | Hillerbrand et al. | ........ | 707/104.1 |
| 2004/0098447 A1 * | 5/2004 | Verbeke et al. | ................. | 709/201 |

OTHER PUBLICATIONS

"Object Evaluator Management Function"; Deokjai Choi et al.; Retrieved from Internet http://www.isoc.org/HMP/PAPER/203/html/paper.html; 7 pages, Dec. 15, 1994.

"Developing Multi-Agent Systems with a FIPA-Compliant Agent Framework", *Software—Practice & Experience*; Fabio Bellifemine et al.; 26 pages, Feb. 2001.

"Score Big with JSR 77, the J2EE Management Specification; Standardize J2EE Server Management with JSR 77"; Java World.com; Retrieved from Internet http://www.javaworld.com/javaworld/jw-06-2002/jw-0614-mgmt_p.html; 8 pages, Jun. 14, 2002.

Notification of Transmittal of the International Search Report and the Written Opinion of the International Searching Authority, or the Declaration; International Application No. PCT/US2004/009880; 12 pages, Oct. 1, 2004.

Communication pursuant to Article 96(2) EPC; Application No. 04 759 079.9-1244; 4 pages, May 30, 2007.

* cited by examiner

*Primary Examiner* — Thu Nguyen
*Assistant Examiner* — Joseph Greene
(74) *Attorney, Agent, or Firm* — Baker Botts L.L.P.

(57) ABSTRACT

Method and system for alert notification is provided. A Simple Object Access Protocol (SOAP) based alert notification is sent from one or more agents, and the SOAP based alert notification(s) is received at a manager.

27 Claims, 12 Drawing Sheets

METHOD AND SYSTEM OF ALERT NOTIFICATION

This is a continuation of application Ser. No. 10/813,376 filed Mar. 30, 2004 now abandoned and is based on and claims the benefit of Provisional applications 60/460,258, 60/460,467, 60/460,208 each filed Apr. 4, 2003.

REFERENCE TO RELATED APPLICATIONS

The present disclosure is based on and claims the benefit of Provisional Applications 60/460,208 filed Apr. 4, 2003, entitled "Web Services Based Discovery of Remote Agents", 60/460,467 filed Apr. 4, 2003, entitled "SOAP Based Alert Notifications for System Management", and 60/460,258 filed Apr. 4, 2003, entitled "Web Services Based Management and Configuration of Remote Agents", the entire contents of which are herein incorporated by reference.

BACKGROUND

1. Technical Field

The present disclosure relates generally systems management and, more particularly, to a method and system of alert notification.

2. Description of the Related Art

Systems management involves the supervision of information technology in an enterprise. System management tools may include two primary elements, agents and managers. The agents are the entities that provide an interface to a device that needs to be managed, such as a server, router, bridge, hub, printer, etc. The device, such as a server, can contain a series of managed objects, such as hardware, configuration parameters, performance statistics, etc. which can all be managed by the agents. The manager can be a user interface to enable a user, such as a network administrator to perform management functions, such as constantly viewing and changing the configuration and status of remote agents.

It is useful if users, such as network administrators are able to discover agents and remotely manage them from a central management console through a web based service. In addition, it is useful if managers are able to accurately receive alert notifications to alert them of changes that can occur on an agent system. In globally distributed networks, there is a very high likelihood of a firewall, proxy server, and/or virtual private network ("VPNs") between the agent nodes and the management console. It is useful if a manager is able to discover, manage and configure a wide variety of agents through a single management console across the firewall, proxy server, and/or VPNs.

Simple Network Management Protocol ("SNMP") is a standard designed to help managers remotely manage devices, such as servers, printers, routers, etc. However, in the presence of a firewall, proxy server, or VPN, SNMP can prove to be unreliable.

Accordingly, it would be beneficial to provide a reliable and effective way to ensure that remote agents are able to send alerts to the event console, and are effectively managed and configured.

SUMMARY

A method of alert notification, according to an embodiment of the present disclosure, includes sending a Simple Object Access Protocol (SOAP) based alert notification from one or more agents, and receiving the SOAP based alert notifications at a manager.

A system of alert notification, according to an embodiment of the present disclosure Includes at least one agent for sending a SOAP based alert notification, and at least one manager for receiving the SOAP based alert notification.

A computer storage medium including computer executable code for alert notification, according to an embodiment of the present disclosure, includes code for sending a SOAP based alert notification, and code for receiving the SOAP based alert notification.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides tools (in the form of methodologies, apparatuses, and systems) for alert notification. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
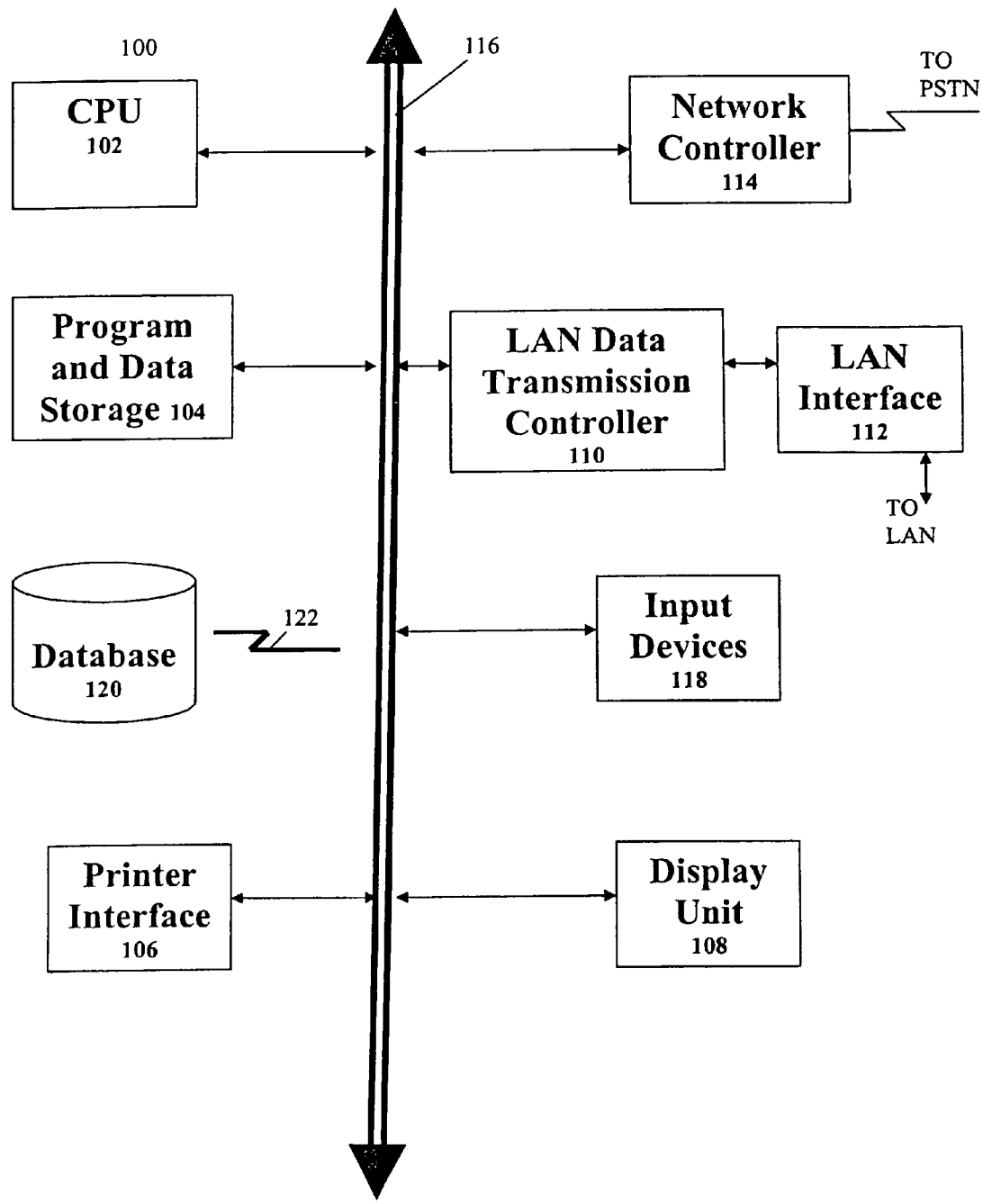
FIG. 1 shows a block diagram of an exemplary computer system capable of implementing the method and system of the present disclosure.

FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

According to an embodiment of the present disclosure, a management application (i.e., a manager) can be installed in three components: an agent, which can reside on the same system as the application server; a manager, which can be fully integrated with the management application or can stand alone, and a console, which can provide a user interface. System(s) as referred to herein may include(s) individual computers, servers, computing resources, networks or combinations thereof, etc. Users of the management application can include, application server administrators, system administrators, performance managers, and application server developers, etc. Since the agents and managers may be in a distributed environment, they may be separated by firewalls, proxy servers, and/or VPNs, etc, where SNMP is not a practical communication protocol. According to an embodiment of the present disclosure, a Simple Object Access Protocol (SOAP) is utilized. SOAP is a stateless, one-way message exchange system which can also be utilized to perform request/response, request/multiple responses, etc. in a distributed environment.

Discovery is a process of creating a manager side representation of the agent side schema and can touch every layer of the management application. A successful discovery process may be implemented for the administration, configuration and overall successful functioning of the management application. According to an embodiment of the present disclosure, web based agent services can discover any type of remote agent through a single management console, even through firewalls, proxy servers, and/or VPNs, etc.

After remote agents are discovered by the management console, a user, such as a system administrator, may constantly view and change the configuration and status of remote agents. Therefore, it is useful if agents are able to be configured to run across firewalls, proxy servers, and/or VPNs, etc. According to an embodiment of the present disclosure, a single management console can manage web based remote agents and can be configured to run across firewalls, proxy servers, and/or VPNs.

An agent can have a layout and hierarchy of various types, with each instance representing the various facets of the managed resources, both individual and collective. The discovery process can identify this schema, translate it into a manager side representation compatible with a manager repository, and create the representation in the manager repository, making the data available for various other applications via the repository. Discovery can also include both registering the manager with the agent as a recipient of alert notifications as and when they are raised by the agent and initializing performance data collection for the agent and its objects.

Figure 2:
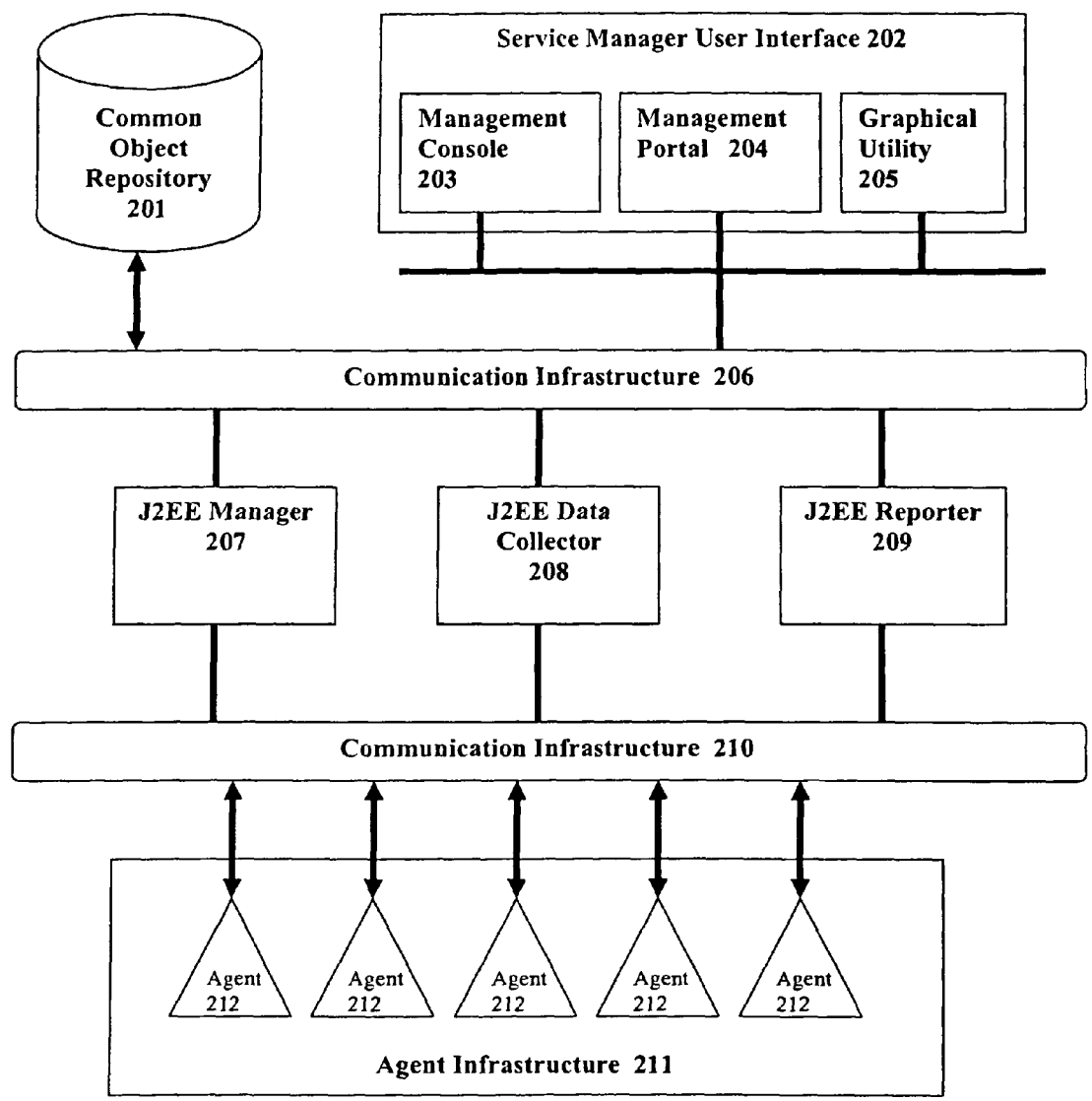
FIG. 2 shows a system for agent management, according to an embodiment of the present disclosure.

A more detailed description of a system for agent management and configuration of remote agents, according to an embodiment of the present disclosure, will be described with reference to FIG. 2. Each agent 212 is a software component capable of monitoring managed objects and reporting their status to a J2EE manager 207 through a communication infrastructure 210. An example of an agent may include, for example, 100 managed objects and can handle XML/character data information.

Examples of managed objects are the devices, systems, and/or any hardware or software that require some form of monitoring and management. A managed object can be defined in terms of the attributes it possesses, operations that may be performed on it, and its relationship with other managed objects. According to an embodiment of the present disclosure, a managed object can be a one-to-one mapping to the manageable entities within an application server and its components. The managed objects are described in further detail below.

A Service Manager User Interface 202 may, for example, be similar to a "Windows"Service manager and is used to discover and configure the agent, view the status of the managed objects and/or launch reports. The Service Manager User Interface 202 can allow a user to start, stop, and recycle services including, for example, the following manager services: J2EE manager 207, J2EE data collector 208, and J2EE reporter 209 through communication structure 206. J2EE manager 207 can register itself with all discovered agents and can log agent behavior for life cycle management. J2EE manager 207 can have a scheduler to enable timed events and can send out email notifications due to alerts.

A user can have the option to collect data and can set a pre-defined collection frequency. J2EE data collector 208 can collect this data for the agents and their objects via agent infrastructure 211. A user can launch reports generated by the J2EE reporter 209 through the Service Manager User Interface 202. J2EE manager 207 and agents 212 can communicate using SOAP through communication infrastructure 210 and the J2EE manager 207 can communicate with the user interface 202 using HTTP through communication infrastructure 206.

The Service Manager User Interface 202 can include a management console 203, a management portal 204 and/or a graphical utility 205. The management console 203 can be a java based manager component that displays an event, such as an unsolicited alert notification from a manager or agent indicating, for example, that one of the following conditions may have occurred: a threshold limit was exceeded, the network topology changed, an informational message or error occurred, and/or an application alert occurred, etc. There is no set limit to the number of users that can access the management console 203. The management console 203 can be used to create, update and delete monitored objects. A command line utility can be provided to allow a user to perform all user interface functions from the command line. The management console 203 can be a plug in or can be launched via a right click menu. Agents 212 can be configured through the management console 203 and users can configure the monitoring interval for each object. The current status and value for each selected object can be provided through the management console 203. The management console 203 can also allow a user to enter and edit threshold values, such as, for example, "Warning", "Major", and "Critical". The threshold values can pertain to a threshold level associated with alert notifications. Alert notifications that are of a lower priority value than the threshold value, for example, may not be displayed on the management console 203. The management console 203 can list all registered managers. According to an embodiment of the present disclosure, the type of information that is handled can be XML/character data and the maximum size of the information handled can be 1K/request.

Management portal 204 can provide a web based information management system that provides a single access point for users to share information. For example, a system administrator can use the management portal 204 to access the management console 203 that can be used to manage and configure one or more remote agents.

The graphical utility 205 is a manager component that enables a user, such as a system administrator, to configure, browse, and/or edit any agent configuration. The utility can provide an interface to add, remove, and modify objects in the configuration.

A common object repository 201 provides other applications with data that is common to all.

Figure 3:
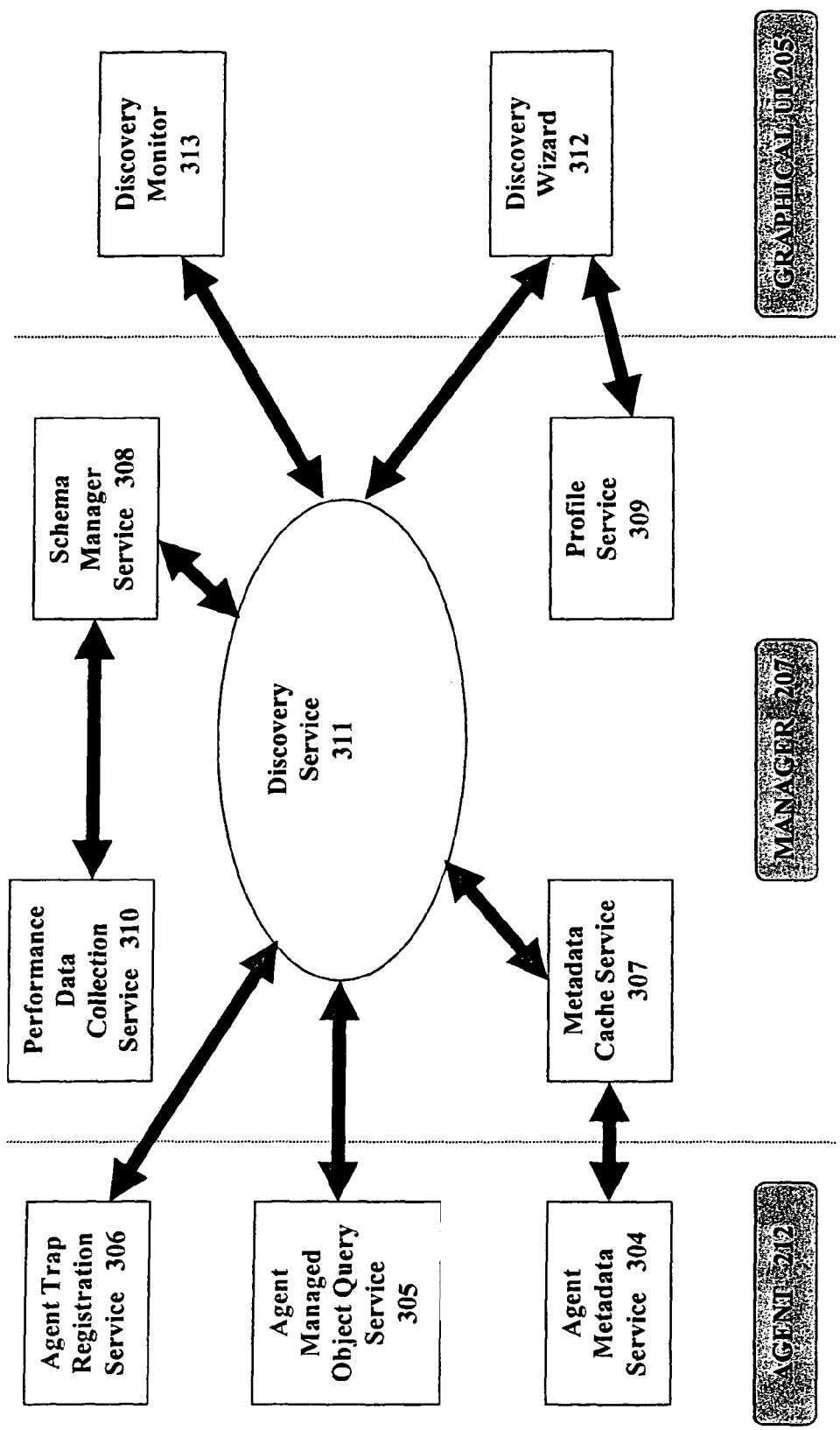
FIG. 3 shows a schematic diagram illustrating the discovery architecture, according to an embodiment of the present disclosure.

Discovery may utilize a series of services/modules from the agent and the user interface that assist in the discovery process. FIG. 3 is a schematic diagram illustrating the discovery architecture, according to an embodiment of the present disclosure. The diagram is divided into three parts, where each part represents a layer of the product. The graphical user interface ("GUI") 205 is used to initiate the discovery process via a discovery wizard 312. The actual discovery is launched by a manager 207 against an agent 212.

The Agent Metadata Service 304, Agent Managed Object Query Service 305, and Agent Trap Registration Service 306 are examples of services running on an agent 212. The Agent Metadata Service 304 supports queries to retrieve metadata information residing on the agent 212. The metadata information can include, for example, parent-child relationships between managed objects ("MOs") and clustered managed objects ("CMOs"), property information of a MO or CMO, and/or information about all events of any given MO or CMO. A more detailed description of the Agent Metadata Service 304 will be provided below. The Agent Managed Object Query Service 305 is used by the Discovery Service 311 and provides information regarding all MO and CMO instances that have been created on the agent 212. The information may include instance properties and properties of some or all events under any instance. The Agent Trap Registration Service 306 is a service used by the Discovery Service 311 and can receive requests for addition, deletion and update of listeners interested in receiving alert notifications that an agent 301 can send. The information used for registration can include parameters to identify the listener uniquely, connection parameters, security credentials, and/or information on proxy servers, if present. The Discovery Service 311, at the end of discovery, can register with the Agent Trap Registration Service 306 to add itself as a listener.

The Discovery Service 311, Metadata Cache Service 307, Schema Manager Service 308, Profile Service 309, and Performance Data Collection Service 310 are examples of services running on the manager 207. The Discovery Service 311 is the main service that interacts with other services running on the manager 302 and can receive one or more targets for discovery. A target can be, for example, an agent, a MO, or a CMO.

Figure 4:
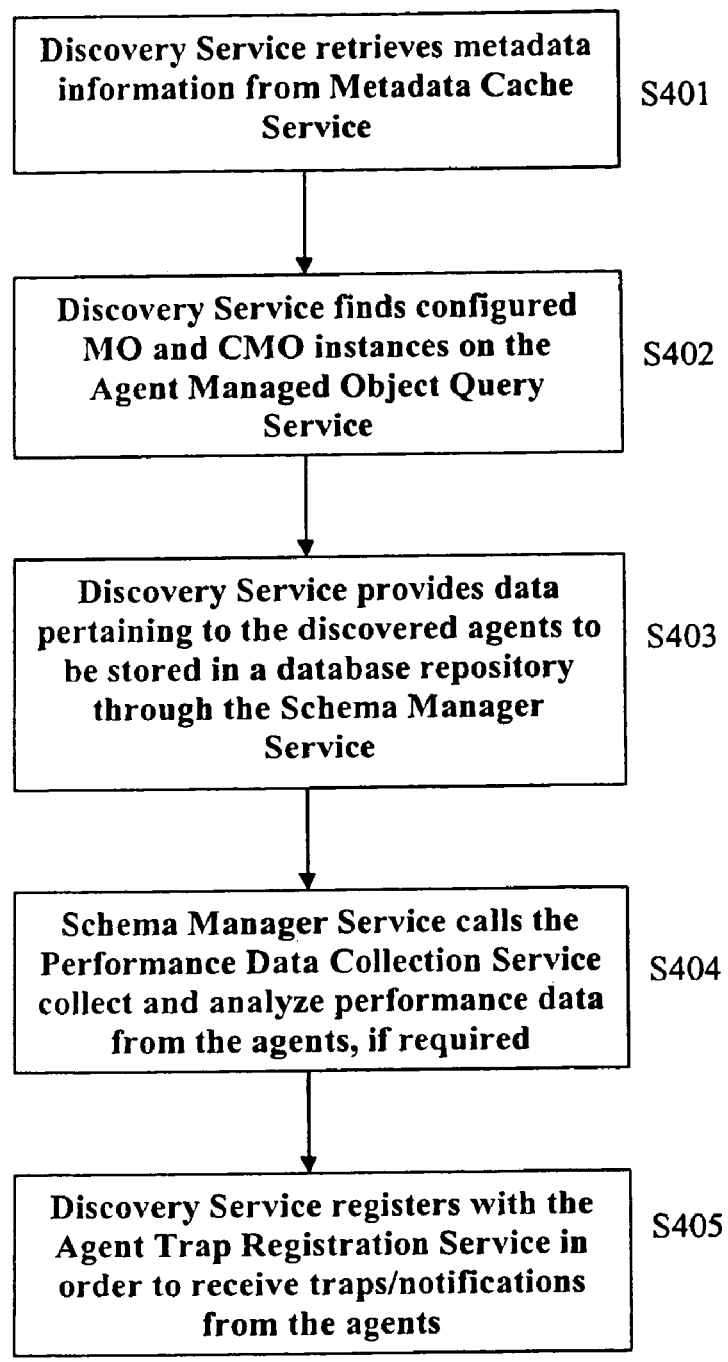
FIG. 4 shows a flow chart illustrating the sequence of execution of all the operations on a specified target during the discovery process, according to an embodiment of the present disclosure.

The sequence of execution of operations on a specified target during the discovery process will be described with respect to FIGS. 3 and 4. The Discovery Service 311 first retrieves metadata information from the Metadata Cache Service 307 (Step S401). The Metadata Cache Service 307 can retrieve metadata information during discovery from the Agent Metadata Service 304 and the Schema Manager Service 308 and can cache the information to speed up the discovery process. After retrieval of metadata information, the Discovery Service 311 finds all configured MO and CMO instances on the Agent Managed Object Query Service 305 (Step S402). Data pertaining to the discovered agents is then provided by the Discovery Service 311 to be stored in a database repository through the Schema Manager Service 308 (Step S403). The Schema Manager Service 308 can provide a facade over the database repository which can facilitate addition/deletion/update of agent schema objects into the repository. As part of object creation, the Schema Manager Service 308 can call the Performance Data Collection Service 310 to collect and analyze performance data from the agents, if required (Step S404). The Discovery Service 311 can then register with the Agent Trap Registration Service 306 in order to receive alert notifications from the agents (Step S405).

A Profile Service 309 can store the discovery target information as individual discovery profiles, eliminating the need for continuously entering discovery details. A discovery profile may include of one or more targets, allowing a user to create a logical grouping of discovery targets. If a profile contains multiple targets, the profile can be either a discrete list of targets or can be specified by a range of Internet Protocol (IP) addresses. Apart from the host name, or IP addresses, the discovery profile can also contain proxy information used to connect to the host, the connection details, security credentials, and/or a flag indicating whether the profile has been enabled. The Profile Service 309 can supply the Discovery Service 311 with a list of stored profiles and upon request, can be used to create, update, or delete the profiles. The Performance Data Collection Service 310 adds the discovered agent objects for data collection.

The Discovery Wizard 312, and Discovery Monitor 313 are graphical user interfaces 205 that interact with Discovery Service 311. The Discovery Wizard 312 provides a user interface to describe the discovery targets by pulling up the existing list of profiles from the Profile Service 309 and displaying them to a user in a tabular format. The user can create new discovery profiles, delete old ones, or update various target fields. The Discovery Wizard 312 can also create a set of discrete target objects from the current profiles and submit the list to the Discovery Service 311. The Discovery Wizard 312 then launches the Discovery Monitor 313, which is a user interface that keeps track of the status and results of the current discovery. The Discovery Monitor 313 indicates to a user if a discovery process is running by continuously polling status and log messages from the Discovery Service 311 and displaying them to the user. When discovery is complete, the Discovery Monitor. 313 can display the results of discovery as a tree to the user.

Figure 5:
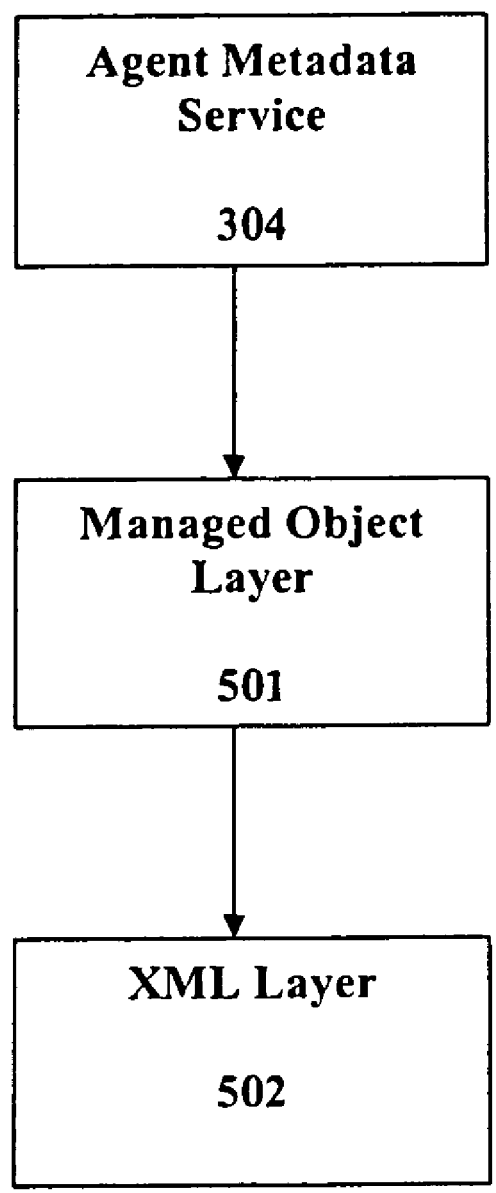
FIG. 5 shows a block diagram illustrating how the Agent Metadata Service provides metadata to clients; according to an embodiment of the present disclosure.

The Agent MetaData Service 304 is a SOAP based service on the agent 301 that is used by SOAP clients (e.g., manager 207) to get agent metadata. According to an embodiment of the present disclosure, the following are the-data elements for the agent that the Agent Metadata Service 304 can provide to all SOAP clients: Product Name, Product Version, Product Key, Application Server Name, Application Server Version, Build Number, Agent Class Name, Event Class Name, Alerts Class Name, Managed Objects, Managed Object Path, Managed Object Relations, Managed Object Descriptor Properties, Event Set, Event Set Descriptor Properties, Event List, Event Relations, etc. The following methods can be invoked by the Agent Metadata Service 304: "getabout" (can return Product Name, Product Version, Product Key, Application Server Name, Application Server Version, and Build Number); "getAgentCoreClasses" (can return Agent Class Name, Event Class Name, and Alerts Class Name); "getMOList" (can return a list of all managed objects); "getMORelations" (can return a tree structure of all managed object relations); "getMODescriptorProperties" (can return managed object descriptor properties, such as, Name, Nice Name, Description, and other user interface related properties for a managed object); "getPropertySet" (can return a tree structure of managed objects with their properties); "getEventSetList" (can return a list of events for a managed object); "getEventSetDescriptorProperties" (can return managed object descriptor properties, such as, Name, Nice Name, Description, and other user interface related properties for an event set); "getEventList" (can return the list of events in an event set for a managed object); "getEventRelations" (can return a tree structure consisting of event sets and the events for a managed object); "getEventPropertySet" (can return a tree structure consisting of event name as a node and event property name values as attributes). FIG. 5 shows how the Agent Metadata Service 304 provides metadata to SOAP clients (e.g., manager 207). The Agent Metadata Service 304 queries an underlying Managed Object Layer 501 which in turn retrieves data from an XML layer 502 to provide the metadata to the clients.

The Discovery Wizard 312 is the graphical user interface 205 that enables a user to access the Discovery Service 311. There are four different common tasks that can be performed for discovery by a user, discovering an agent with valid agent host and agent port, discovering an agent with valid agent host name and port, discovering multiple agents, and updating profiles, each of which will be described in further detail below.

Figure 6:
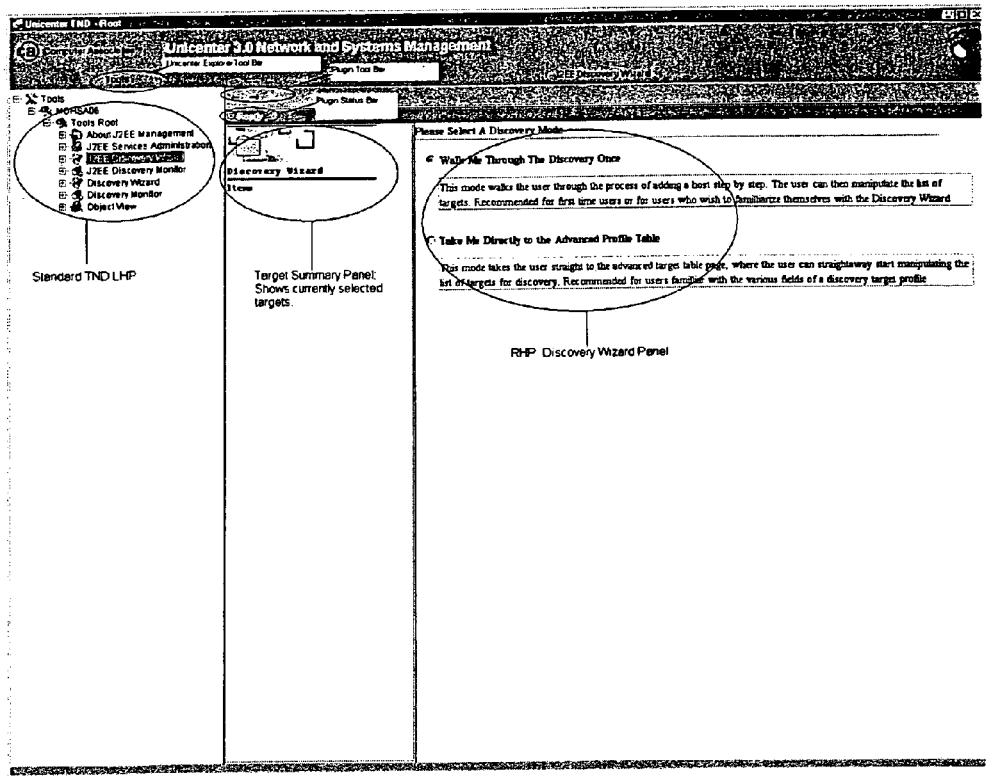
FIG. 6 shows a graphical user interface allowing the user to choose between the two different discovery modes, according to an embodiment of the present disclosure.
Figure 7:
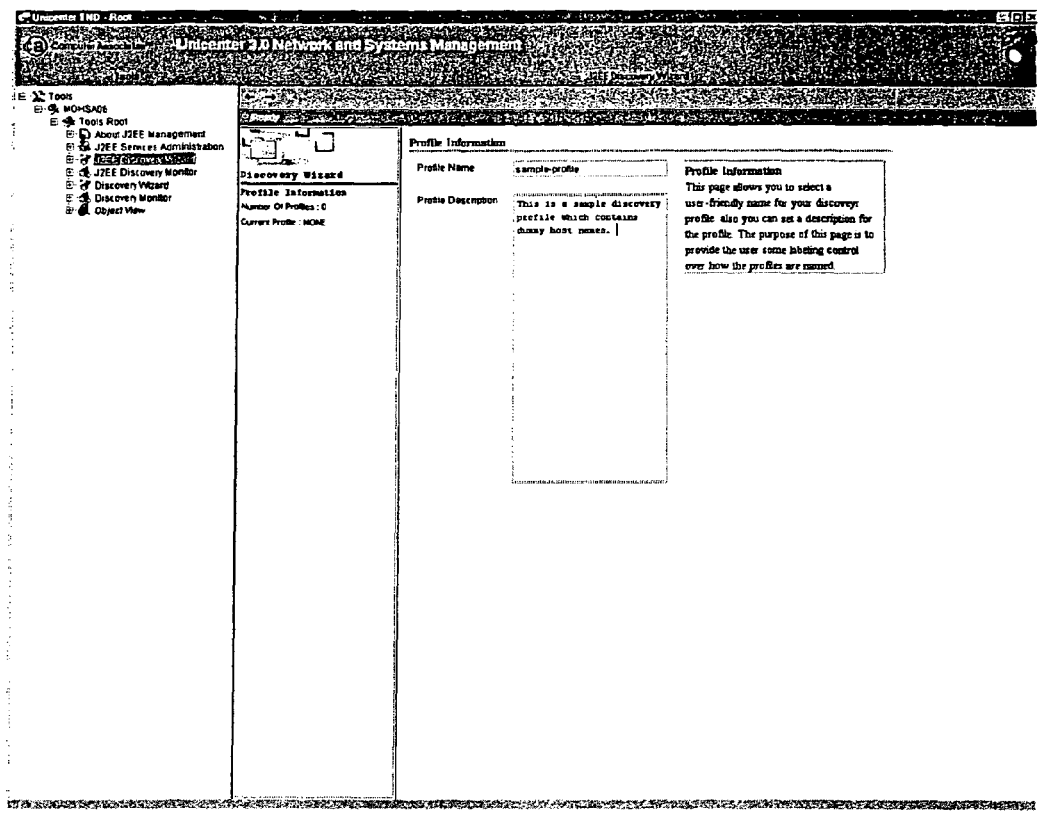
FIG. 7 shows the second step of the discovery process, in which a graphical user interface is provided allowing the user to select and enter profile information, according to an embodiment of the present disclosure.
Figure 8:
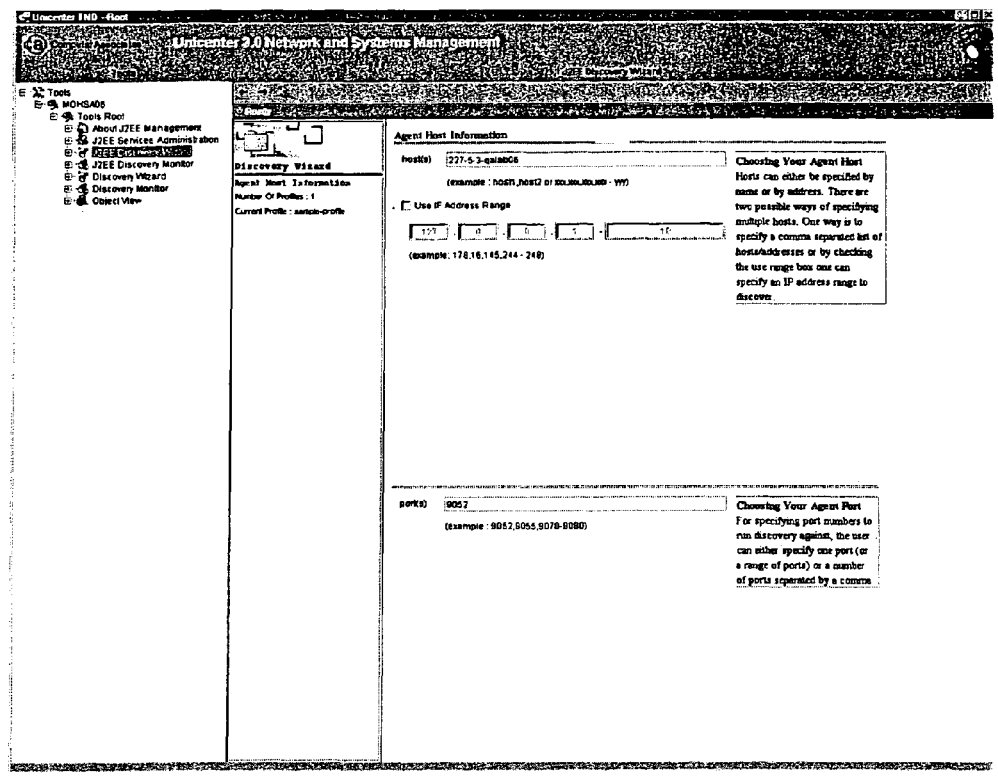
FIG. 8 shows a graphical user interface allowing a user to perform the third step of entering agent host information, according to an embodiment of the present disclosure.
Figure 9:
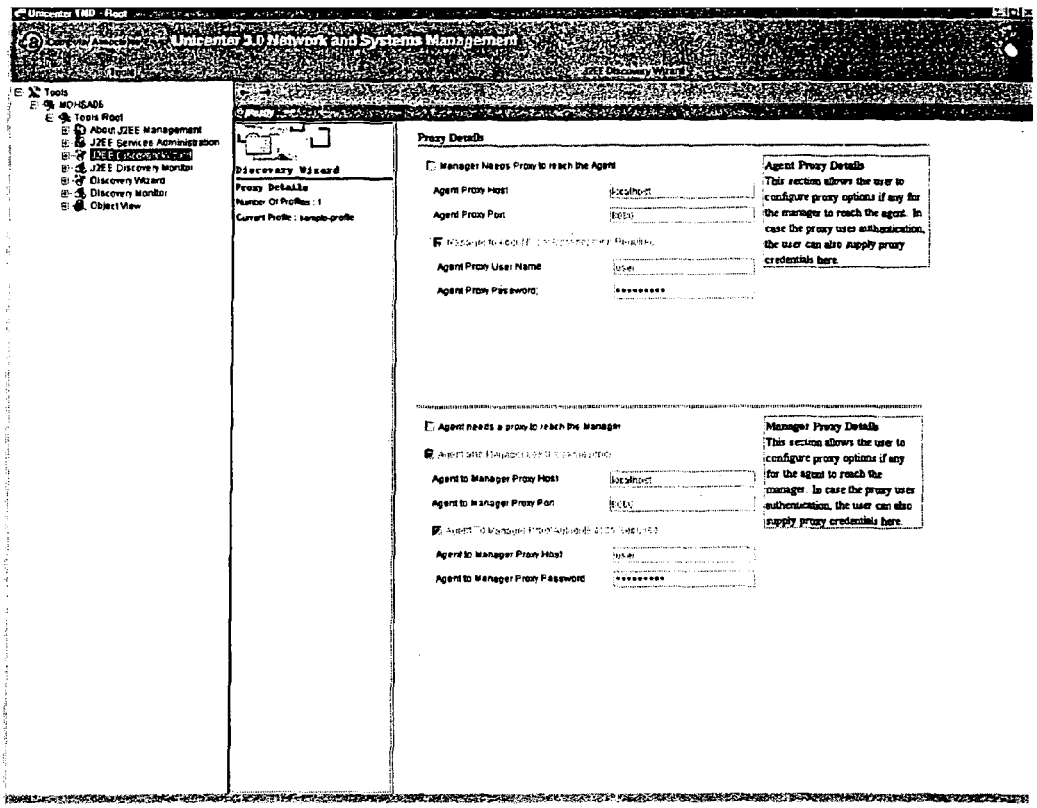
FIG. 9 shows a graphical user interface allowing the user to input proxy details for an agent or manager, according to an embodiment of the present disclosure.
Figure 10:
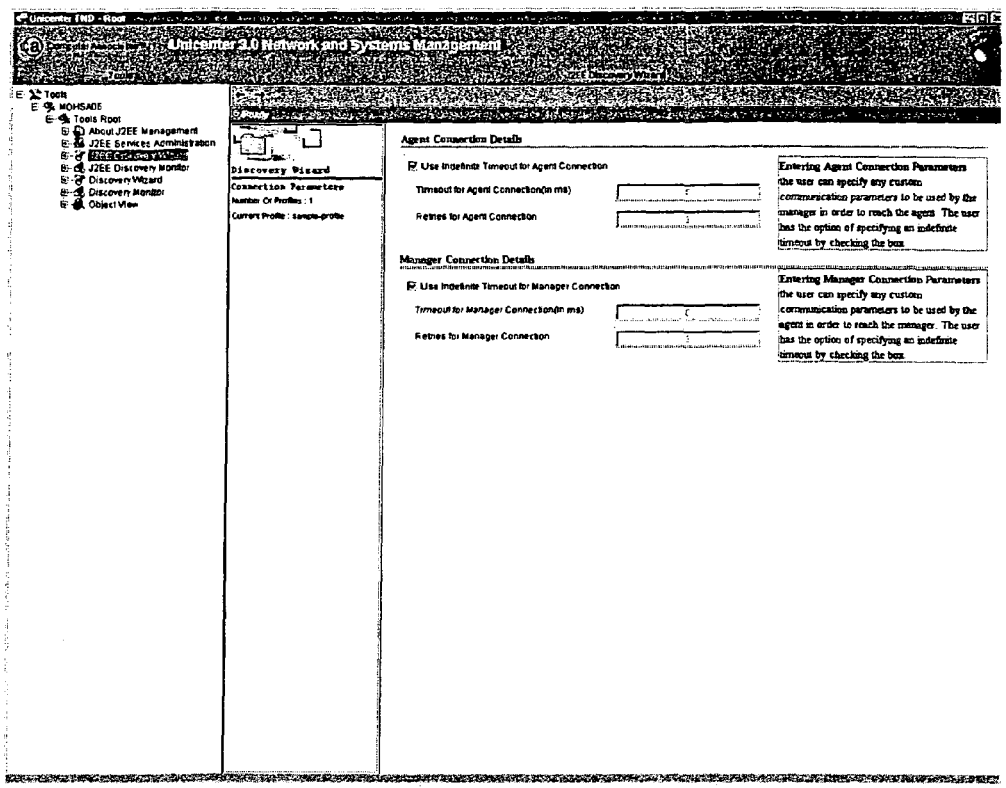
FIG. 10 shows a graphical user interface allowing the user to input connection details for an agent or manager, according to an embodiment of the present disclosure.
Figure 11:
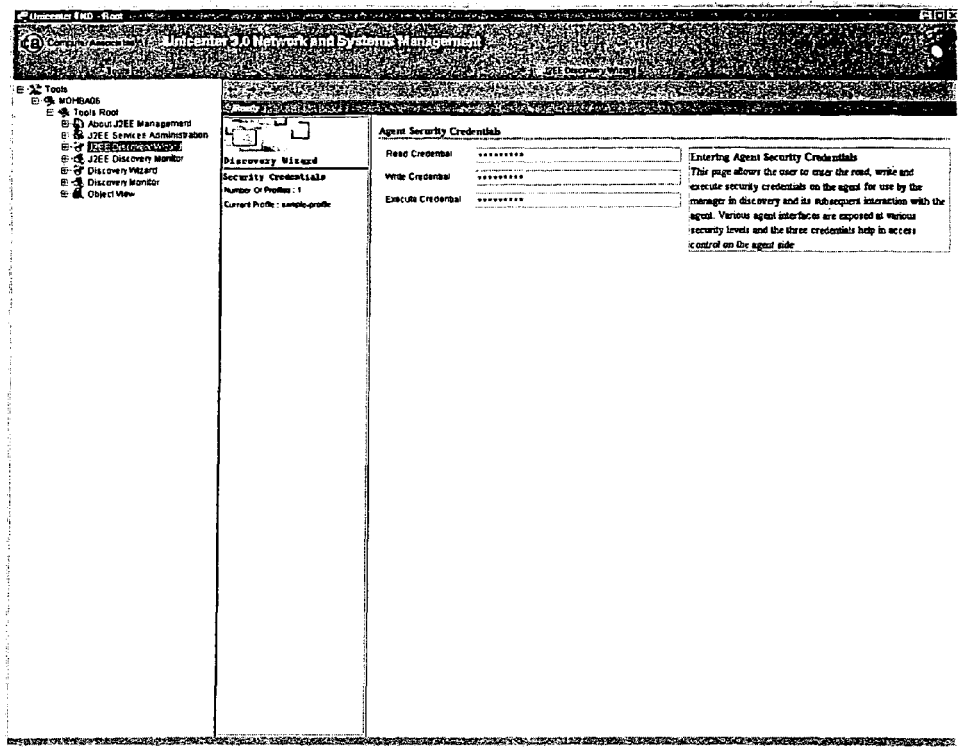
FIG. 11 shows a graphical user interface for verifying security credentials, according to an embodiment of the present disclosure.
Figure 12:
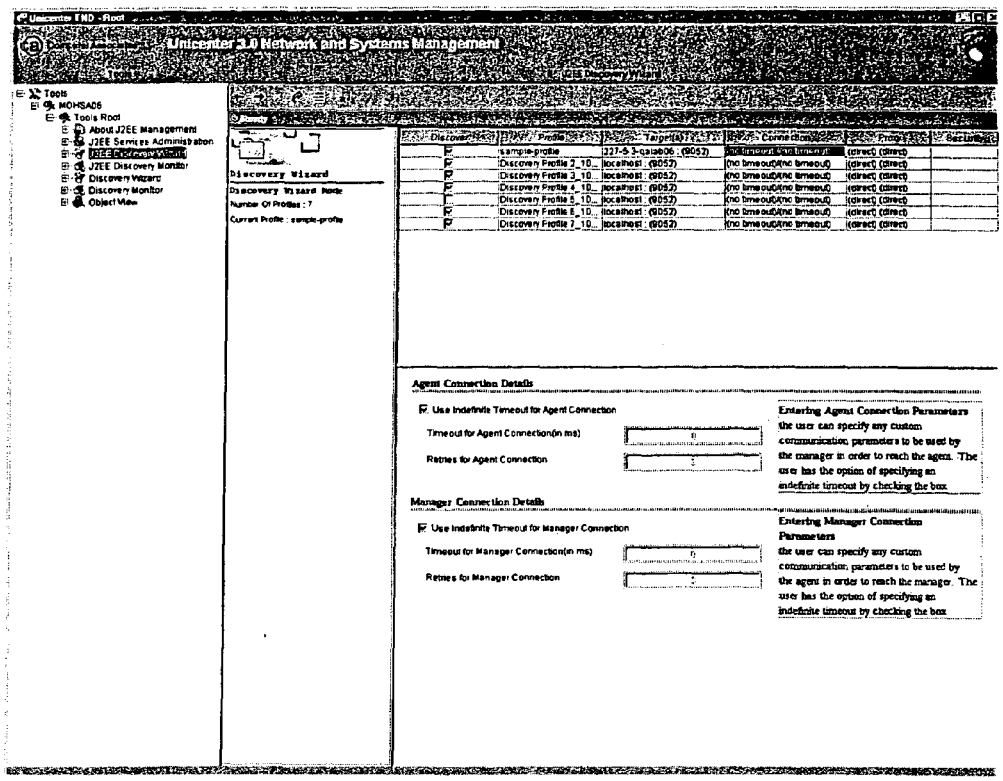
FIG. 12 shows a graphical user interface used for presenting a list of discovered agents to a user, according to an embodiment of the present disclosure.

A user can discover an agent with a valid agent host and an agent port. According to an embodiment of the present disclosure, a user first chooses one of two modes of operation. FIG. 6 illustrates a GUI allowing the user to choose between the two different discovery modes. The first mode (A) can walk a user through the process of adding a host step by step. The user can then manipulate the list of targets. The second mode (B) can take a user directly to the advanced profile table, where the user can immediately start manipulating the list of targets for discovery. FIG. 7 shows the second step of the discovery process, in which a GUI is provided allowing the user to select a user-friendly name for the discovery profile and enter a profile description. FIG. 8 illustrates a GUI allowing a user to perform the third step of entering the agent host information. Hosts can either be specified by name or by address. There are various ways of specifying multiple hosts. For example, a user can specify a comma-separated list of hosts and addresses or specify an IP address range to discovery by checking the "use range" box. A fourth step in the discovery process involves inputting the proxy details for either an agent or manager. FIG. 9 illustrates a GUI allowing the user to input their information. If a user chooses to enter the agent proxy details, then the user can configure proxy options, if any, for a manager to reach the agent. If a user chooses to enter the manager proxy details, then the user can configure proxy options, if any, for the agent to reach the manager. In case the proxy uses authentication, the user can also supply proxy credentials during this step. A fifth step in the discovery process involves inputting the connection details for either an agent or manager. FIG. 10 illustrates a GUI allowing the user to input this information. If a user chooses to enter the agent connection details, then the user can specify custom communication parameters to be used by the manager in order to reach the agent. If the user chooses to enter the manager connection details, then the user can specify custom communication parameters to be used by the agent in order to reach the manager. For both of these options, the user can specify infinite timeout by checking the requisite box. FIG. 11 illustrates a GUI for entering security credentials. A user can enter the read, write, and execute security credentials on the agent for use by the manager in the discovery and its subsequent interaction with the agent. Various agent interfaces are exposed at various security levels and these credentials can help in providing access control on the agent side. The last step includes displaying a list of discovered agents to a user. The list can contain the agent host entered by the user. FIG. 12 illustrates a GUI used for presenting the information to the user.

A user can discover an agent with a valid agent host name and an agent port. This task is similar to the previous task, except that the user chooses the second mode (advanced profile table) in the first step and does not have to enter profile information.

A user can discover multiple agents by following the above steps and entering in multiple hosts and ports for the sixth step. To specify multiple hosts, a user can type a comma separated list of machine names for hosts or select the address range check box and specify the range of IP address that are to be discovered. To specify multiple ports, a user can either enter a comma separated list of ports (agent will be discovered using each port number present in the list), specify a range of ports (agent will be discovered using each port number present in the range), or can specify a single port (all agents will be discovered using same port number). All the hosts specified by a user can be displayed in a tabular format. The user can select a particular agent by selecting the row for that agent. The corresponding detailed view for the agent can be shown at the bottom of the selected row.

According to an embodiment of the present disclosure, an agent can be a pure Java implementation. An agent can create and monitor real time transactions and synthetic non-intrusive business logic transactions, where the business logic can include object support. An agent can automatically load static and dynamic classes of the application server and can persistently store data. For each metric, an agent can accept user-defined policies, via a user interface to escalate a state (available states can include normal, warning, or critical). When a state is changed within the agent, the agent can send a trap/notification to all its registered managers. A trap/notification is a message sent from an agent to notify another system or alert a manager of changes or events that occur on the agent system. These traps/notifications can be sent using SOAP. According to an embodiment of the present disclosure, an agent can run as a standard windows service and allow a user to execute task/scripts on the server.

An agent can also monitor J2EE applications, operating system resources, generic applications, etc. Managed objects are provided for each of these features and are each described in detail below.

Managed Objects for Monitoring J2EE Applications

1) Administration Server Managed Object

An Administration Server Managed Object can monitor "Access" where the agent sends a "ping" to the administration server to determine if the server is accessible. The Administration Server Managed Object can also monitor the "Most Recent Symptom" found in a log file and the "Log Message Broadcast Rate", which is the rate per minute at which log messages are being broadcast.

2) Cluster Managed Object

A Cluster Managed Object can monitor the following events: "Fragments Sent" (total number of multicast fragments sent from the server into the cluster), "Fragments Sent Rate"(total number of multicast fragments sent from the server into the cluster per minute), "Fragments Received" (total number of multicast messages received on the server from the cluster), "Fragments Received Rate" (total number of multicast messages received on the server from the cluster per minute), "Multicast Messages Lost" (total number of incoming multicast messages that were lost according to the server), "Multicast Messages Lost Rate"(total number of incoming multicast messages that were lost according to the server per minute), "Foreign Fragments Dropped" (number of fragments that originated in foreign domains/cluster that use the same multicast address), "Foreign Fragments Dropped Rate"(number of fragments that originated in foreign domains/cluster that use the same multicast address per minute), "Alive Server" (current total number of alive servers in the cluster), "Resend Requests" (number of state-delta messages that had to be resent because a receiving server in the cluster missed a message), and "# of Primaries" (number of objects that the local server hosts as primaries).

3) Managed Server Managed Object

A Managed Server Managed Object can include the following children: a Connection Managed Server Child Managed Object, an Execute Queue Managed Server Child Managed Object, a Thread Managed Server Child Managed Object, each of which will be described in further detail below.

The Managed Server Managed Object can monitor "Access" where the agent sends a "ping" to the administration server to determine if the server is available. The Managed Server Managed Object can also monitor the "Most Recent Symptom" found in a log file and the "Log Message Broadcast Rate", which is the rate per minute at which log messages are being broadcast. The following events can also be supervised by the Managed Server Managed Object: "Heap Size Free" (current heap free), "Heap Size Used" (current size of the heap), "Heap Usage Rate" (heap usage per minute), "Login Attempts While Locked"(cumulative number of invalid logins attempted on the server while the user was locked), "User Lockout" (cumulative number of user lockouts done on the server), "User Lockout Rate" (cumulative number of user lockouts done on the server per minute), "Unlocked Users"(the number of times a user has been unlocked on the server), "Invalid Login Attempts"(cumulative number of invalid logins attempted on the server), "Invalid Login Attempts Rate" (cumulative number of invalid logins attempted on the server per minute), "Invalid Login Users—High" (highwater number of users with outstanding invalid login attempts for the server), "Current Locked Users" (number of currently locked users on the server), "Current Locked Users Rate" (number of currently locked users on the server per minute), Sockets Opened ("total number of sockets opened"), "Sockets Opened Rate" (total number of sockets opened per minute), "Restarts" (total number of restarts), "Current Open Sockets"(current number of open sockets), "Current Connections" (current number of connections to the server), "Maximum Connections" (peak number of connections to the server since the last reset), "Total Connections" (total number of connections made to the server since the last reset), "Total Connections Rate" (total number of connections per minute made to the server since the last reset), "Current JMS Servers" (current number of Java Message Servers (JMS) that are deployed on the server instance), "Maximum JMS Servers" (peak number of JMS servers that were deployed on the server instance since the server was started), "Total JMS Servers" (number of JMS servers that were deployed on the server instance since the server was started), "Transactions Rolled Back" (number of transactions that were rolled back), "Transactions Rolled Back Rate" (number of transactions per minute that were rolled back), "Transactions With Heuristics Status Rate" (number of transactions per minute that completed with a heuristic status), "Transactions Rolled Back Due To System Error"(number of transactions that were rolled back due to an internal system error), "Transactions Rolled Back Due To System Error Rate" (number of transactions per minute that were rolled back due to an internal system error), "Transactions Rolled Back Due To Application Error"(number of transactions that were rolled back due to an application error), "Transactions Rolled Back Due To Application Error Rate"(number-of-transactions per minute that were rolled back due to an application error), "Abandoned Transactions" (number of transactions that were abandoned), "Abandoned Transactions Rate" (number of transactions per minute that were abandoned), "Total Transactions" (total number of transactions processed, including all committed and rolled back and heuristic transaction completions), "Total Transactions Rate" (total number of transactions per minute processed, including all committed and rolled back and heuristic transaction completions), "Transactions Rolled Back Due To Timeout" (number of transactions that were rolled back due to a timeout expiration), "Transactions Rolled Back Due To Timeout Rate" (number of transactions per minute that were rolled back due to a timeout expiration), "Active Transactions" (number of active transactions on the server), "Active Transactions Rate" (number of active transactions per minute on the server), "Transactions Committed" (number of committed transactions), "Transactions Committed Rate" (number of committed transactions per minute), "Transactions Rolled Back Due To Resource Error" (number of transactions that were rolled back due to a resource error), and "Transactions Rolled Back Due to Resource Error Rate"(number of transactions per minute that were rolled back due to a resource error).

a) Connection—Managed Server Child Managed Object

This Child Managed Object can monitor the following connection events: "Bytes Received Rate" (number of bytes received per minute since the last reset), "Bytes Sent Rate" (number of bytes sent per minute since the last reset), "Messages Received" (number of messages received by the user since the last reset), "Messages Received Rate" (number of messages received per minute by the user since the last reset), "Messages Sent" (number of messages sent by the session since the last reset), and "Messages Sent Rate" (number of messages sent per minute by the session since the last reset).

b) Execute Queue—Managed Server Child Managed Object

This Child Managed Object can monitor the following performance events: "Pending Requests" (number of waiting requests in the queue), "Serviced Request Total"(number of requests which have been processed by the queue), "Throughput" (number of requests per minute which have been processed by the queue), "Idle Execute Thread" (number of idle threads assigned to the queue), and "Maximum Pending Request Time" (time that the longest waiting request was placed in the queue).

c) Thread—Managed Server Child Managed Object

This Child Managed Object can monitor the following events: "Total Service Requests" (number of requests which have been processed by the queue), and "Throughput"(number of requests per minute which have been processed by the queue).

4) Servlet Managed Object

A Servlet Managed Object can monitor the following events: "Access" (test to determine whether a particular EJB is available), "Total Reloads" (total number of reloads of the servlet), "Average Execution Time" (average amount of time all invocations of the servlet have been executed since created), "Maximum Execution Time" (amount of time the single shortest invocation of the servlet has executed since created), "Minimum Execution Time" (amount of time the single longest invocation of the servlet has executed since created), "Invocation Total" (total number of invocations of the servlet), and "Invocation Total Rate" (total number of invocations of the servlet per minute).

5) EJB Managed Object

An EJB Managed Object can monitor the following events: "Access" (test to determine whether a particular EJB is available), "Transactions Rolled Back" (total transactions rolled back), "Transactions Rolled Back Rate" (total transactions rolled back per minute), "Transactions Timed Out" (total transactions timed out), "Transactions Timed Out Rate" (total transactions timed out per minute), "Transactions Committed" (total transactions committed), and "Transactions Committed Rate" (total transactions committed per minute).

6) Entity EJB Managed Object

An Entity EJB Managed Object can monitor the following events: "Cache Access" (cache access count), "Cache Access Rate" (cache access count per minute), "Cached Beans Rate" (number of beans currently in cache), "Cache Hit Rate" (cache hit count), "Activation"(number of times the bean instance was activated), "Activation Rate" (number of times the bean instance was activated per minute), "Passivation" (number of times the bean instance was passivated), "Passivation Rate" (number of times the bean instance was passivated per minute), "Current Lock Entries", "Total Waiters", "Total Waiter Rate", "Lock Manager Access", "Total Timeout", "Transactions Rolled Back" (total transactions rolled back), "Transactions Rolled Back Rate" (total transactions rolled back per minute), "Transactions Timed Out" (total transactions rolled back per minute), "Transactions Timed Out Rate" (total transactions timed out per minute), "Transactions Committed" (total transactions committed), "Transactions Committed Rate" (total transactions committed per minute), "Total Timeout" (timeout total count), "Beans In Use" (number of beans in use), "Idle Beans" (number of idle beans), and "Waiter Total" (total waiter count).

7) Stateful EJB Managed Object

A Stateful EJB Managed Object can monitor the following events: "Cache Access" (cache access count), "Cache Access Rate" (cache access count per minute), "Cached Beans Rate" (number of beans currently in cache), "Cache Hit Rate" (cache hit count), "Activation" (number of times the bean instance was activated), "Activation Rate" (number of times the bean instance was activated per minute), "Passivation" (number of times the bean instance was passivated), "Passivation Rate" (number of times the bean instance was passivated per minute), "Current Lock Entries", "Total Waiters", "Total Waiter Rate", "Lock Manager Access", "Total Timeout", "Transactions Rolled Back" (total transactions rolled back), "Transactions Rolled Back Rate" (total transactions rolled back per minute), "Transactions Timed Out" (total transactions rolled back per minute), "Transactions Timed Out Rate" (total transactions timed out per minute), "Transactions Committed" (total transactions committed), and "Transactions Committed Rate" (total transactions committed per minute).

8) Stateless EJB Managed Object

A Stateless EJB Managed Object can monitor the following events: "Transactions Rolled Back" (total transactions rolled back), "Transactions Rolled Back Rate" (total transactions rolled back per minute), "Transactions Timed Out" (total transactions timed out), "Transactions Timed Out Rate" (total transactions timed out per minute), "Transactions Committed" (total transactions committed), "Transactions Committed Rate" (total transactions committed per minute), "Total Timeout" (timeout total count), "Beans In Use" (number of beans in use), "Idle Beans" (number of idle beans), and "Waiter Total" (total waiter count).

9) Message EJB Managed Object

A Message EJB Managed Object can monitor the following events: "Transactions Rolled Back" (total transactions rolled back), "Transactions Rolled Back Rate" (total transactions rolled back per minute), "Transactions Timed Out" (total transactions timed out), "Transactions Timed Out Rate" (total transactions timed out per minute), "Transactions Committed" (total transactions committed), "Transactions Committed Rate" (total transactions committed per minute), "Total Timeout" (timeout total count), "Beans In Use" (number of beans in use), "Idle Beans" (number of idle beans), and "Waiter Total" (total waiter count).

10) JDBC Managed Object

A JDBC Managed Object can monitor the following events: "Access" (test to determine whether the EJB is available), "Active Connections" (current total number of active connections), "Active Connections Rate" (current total number of active connections per minute), "Total Connections" (total number of JDBC connections since the pool is instantiated), "Total Connections Rate" (total number of JDBC connections per minute since the pool is instantiated), "Connection Delay Time" (average time necessary to get a connection from the database), "Waiting For Connection" (current total number waiting for a connection), "Maximum Waiting For Connection" (the high water mark of waiters for a connection), "Failure To Reconnect" (number of cases when a connection pool attempted to refresh a connection to a database and failed), "Failures To Reconnect Rate" (number of cases when a connection pool attempted to refresh a connection to a database and failed per minute), "Maximum Wait In Seconds" (number of seconds the longest waiter for a connection waited), "Leaked Connection" (number of leaked connections), "Leaked Connection Rate" (number of leaked connections per minute), "Prep Statement Cache Miss", and "Prep Statement Cache Hit".

11) Connector Connections Managed Object

A Connector Connections Managed Object can include a Connector Connection Child Managed Object, which will be described in further detail below.

The Connector Connections Managed Object can monitor the following events: "Current Connection" (current total active connections), "Maximum Active Connections" (high water mark of active connections in the Connector Pool since the pool was first instantiated), "Average Usage" (running average usage of created connections that are active in the Connector Pool since the pool was last shrunk), "Total Created" (total number of connector connections created in the Connector Pool since the pool was instantiated), "Total Destroyed Connections" (total number of connector connections destroyed in the Connector Pool since the pool was instantiated), "Total Matched Connections" (total number of times a request for a Connector connections was satisfied via the use of an existing created connection since the pool was instantiated), "Total Rejected Connections" (total number of rejected requests for a Connector connections in the Connector Pool since the pool was instantiated), "Current Connections Free" (current total free connections), "Maximum Connections Free" (high water mark of free connections in the Connector Pool since the pool was instantiated), "Initial Capacity" (initial capacity configured for the Connector connection pool), "Maximum Capacity" (maximum capacity configured for the Connector connection pool), "Total Recycled Connections" (total number of Connector connections that have been recycled in the Connector Pool since the pool was instantiated), "Shrink Count Down" (amount of time left (in minutes) until an attempt to shrink the pool will be made), and "Shrink Period" (the amount of time (in minutes) of the Connector connection pool).

a) Connector—Connector Connection Child Managed Object

This Child Managed Object can monitor the following connection events: "Active Connection Handles" (current total active connection handles for the connection), "Maximum Active Connection Handles" (high water mark of active connection handles for the connection since the connection was created), and "Total Connection Handles Created" (total number of connection handles created for the connection since the connection was created).

12) Jolt Connections Managed Object

A Jolt Connection Managed Object can include a Jolt Connection Child Managed Object, which will be described in further detail below.

The Jolt Connection Managed Object can monitor the following event: "Maximum Capacity" (maximum capacity configured for the Connector connection pool).

a) Connection—Jolt Connector Managed Object

This Child Managed Object can monitor the following connection events: "Error Requests" (current total active connection handles for the connection), "Pending Requests" (pending request count), and "Request Count" (total request count).

13) WLEC Connector Managed Object

A WLEC Connector Managed Object can include a WLEC Connector Child Managed Object, which will be described in further detail below.

The WLEC Connector Managed Object can monitor the following event: "Maximum Capacity" (maximum capacity configured for the Connector connection pool).

a) Connection—WLEC Connector Managed Object

This Child Managed Object can monitor the following connection events: "Error Requests" (current total active connection handles for the connection), "Pending Requests" (pending request count), and "Request Count" (total request count).

14) Business Logic Managed Object

A Business Logic Managed Object monitors a Content monitor for all server versions.

15) Insider Managed Object

An Insider Managed Object monitors the real-time performance of EJBs, servlets, and JDBCs.

Managed Objects For Monitoring Operating System Resources

1) Operating System Resources Managed Object

An Operating System Resources Managed Object can include a CPU User—Operating System Resources Child Managed Object and a File System—Operating System Resources Child Managed Object, each of which will be described in further detail below.

The Operating System Resources Managed Object can monitor the following events: "Available Memory" (real value of available memory), "Available Memory Percent" (percentage value of available memory), "Free Memory" (real value of free memory), "Free Memory Percent" (percentage value of free memory), "Swap Space In Use" (swap space that is currently in use), "Free Swap Space" (swap space that is currently free), and "Paging".

a) CPU User—Operating System Resources Child Managed Object

This Child Managed Object can monitor the following CPU User events: "CPU Used" (percentage of CPU used), "Idle Time" (percentage of idle time), "Wait Time" (percentage of wait time), "System Time" (percentage of system time), and "User Time" (percentage of user time).

b) File System—Operating System Resources Child Managed Object

This Child Managed Object can monitor the following File System events: "Available Disk Space" (currently available disk space), "Available Disk Space Percent" (percentage of currently available disk space), "File Size" (total file size), and "File Size Used" (percentage of file size being utilized.

Managed Objects For Monitoring Generic Applications

1) URL Monitor Managed Object

A URL Monitor Managed Object can include a File System—Operating System Resources Child Managed Object, which will be described in further detail below.

The URL Monitor Managed Object can monitor the following events: "URL Status" (test to check whether URL is accessible), "Content Match" (enter a string of text to check for in the returned page or frameset), "Document Checksum" (a checksum comparison each subsequent time it runs), "Round Trip Time" (total time for the entire request), "DNS Lookup Time" (amount of time to translate the host name to an IP address), "Connect Time" (amount of time to make the connection), "Response Time" (amount of time before the first response was received), "Download Time" (amount of time to receive the page contents), and "Age" (amount of time between the current time and the last modified time for the page).

a) File System—Operating System Resources Child Managed Object

This Child Managed Object can monitor the following File System events: "Available Disk Space" (currently available disk space), "Available Disk Space Percent" (percentage of currently available disk space), "File Size" (total file size), and "File Size Used" (percentage of file size being utilized.

2) Port Monitor Managed Object

A Port Monitor Managed Object can monitor the following events: "Access" (test to check whether the port is accessible or not), and "Time" (time taken to connect to the port).

3) Process Monitor Managed Object

A Process Monitor Managed Object can monitor the following events: "Process Size" (real value of the size of the process), "Memory Ratio" (ratio of actual size of the memory occupied by the process to the physical memory on the machine expressed as a percentage), "Number of Threads" (number of threads associated with the process), and "Percent CPU Used" (percent value of the CPU used by the process).

4) HTTP Server Managed Object

A HTTP Server Managed Object only monitors the access event for the server.

5) Custom Application Managed Object

A Custom Application Managed Object can monitor the TCP Server and log files access events for the server.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Numerous additional modifications and variations of the present disclosure are possible in view of the above-teachings. It is therefore to be understood that within the scope of the appended claims, the present disclosure may be practiced other than as specifically described herein.

What is claimed is:

1. A method of alert notification, comprising:
identifying an alert notification agent monitoring a managed object associated with an agent device;
using a discovery process to query an agent metadata service running on the agent device for metadata information residing on the agent, the metadata information comprising information about the managed object;
using the metadata information retrieved from the agent metadata service running on the agent device to identify a schema associated with the alert notification agent;
providing an alert notification manager on a processor-controlled manager device;
using the processor controlled manager device to create a manager-side representation of an agent-side schema associated with the agent device in a repository associated with an alert notification manager;
using the processor controlled device to register the alert notification manager to receive alert notifications from the alert notification agent; and
receiving, at the alert notification manager, one or more Simple Object Access Protocol alert notifications from the alert notification agent, the alert notifications indicating a status of the managed object.

2. The method of claim 1, wherein creating a representation of the schema in a repository associated with the alert notification manager comprises translating the schema into a representation compatible with the alert notification manager.

3. The method of claim 1, wherein registering the alert notification manager to receive alert notifications from the alert notification agent comprises sending a request to register the alert notification manager as recipient of alert notifications regarding the managed object.

4. The method of claim 3, wherein the request comprises one or more pieces of information selected from the group consisting of alert notification manager identification information, connection parameters, security credentials, and proxy server information.

5. The method of claim 1, further comprising recording the one or more alert notifications in an agent behavior log.

6. The method of claim 1, further comprising sending an email notification to a user in response to the alert notification.

7. The method of claim 1, wherein the one or more Simple Object Access Protocol alert notifications are received at predetermined intervals.

8. The method of claim 1, wherein the managed object comprises one or more objects selected from the group consisting of a server, a router, a bridge, a hub, and a printer.

9. A non-transitory storage medium storing a program instructions operable, when executed by one or more processors, to perform the steps comprising:
using a discovery process to query an agent metadata service running on the agent device for metadata information residing on the agent, the metadata information comprising information about the managed object;
using the metadata information retrieved from the agent metadata service running on the agent device to identify an alert notification agent monitoring a managed object associated with an agent device;
identifying a schema associated with the alert notification agent associated with the agent device;
creating a representation of the schema associated with the alert notification agent associated with the agent device in a repository associated with an alert notification manager provided on a processor-controlled manager device;
registering the alert notification manager to receive alert notifications from the alert notification agent; and
receiving, at the alert notification manager, one or more Simple Object Access Protocol alert notifications from the alert notification agent, the alert notifications indicating a status of the managed object.

10. The non-transitory storage medium of claim 9, wherein creating a representation of the schema in a repository associated with the alert notification manager comprises translating the schema into a representation compatible with the alert notification manager.

11. The non-transitory storage medium of claim 9, wherein registering the alert notification manager to receive alert notifications from the alert notification agent comprises sending a request to register the alert notification manager as recipient of alert notifications regarding the managed object.

12. The non-transitory storage medium of claim 11, wherein the request comprises one or more pieces of information selected from the group consisting of alert notification manager identification information, connection parameters, security credentials, and proxy server information.

13. The non-transitory storage medium of claim 9, further operable to perform the step comprising recording the one or more alert notifications in an agent behavior log.

14. The non-transitory storage medium of claim 9, further operable to perform the step comprising sending an email notification to a user in response to the alert notification.

15. The non-transitory storage medium of claim 9, wherein the one or more Simple Object Access Protocol alert notifications are received at predetermined intervals.

16. The non-transitory storage medium of claim 9, wherein the managed object comprises one or more objects selected from the group consisting of a server, a router, a bridge, a hub, and a printer.

17. A system for alert notification, comprising:
an alert notification manager residing on a processor-controlled device; and
a database operable to store information received from the alert notification manager;
wherein the alert notification manager is configured to:
identify an alert notification agent monitoring a managed object associated with an agent device;
use a discovery process to query an agent metadata service running on the agent device for metadata information residing on the agent, the metadata information comprising information about the managed object;
use the metadata information retrieved from the agent metadata service running on the agent device to identify a schema associated with the alert notification agent associated with the agent device;
create, on a processor-controlled manager device, a manager-side representation of an agent-side schema associated with the agent device in the database;
register to receive alert notifications from the alert notification agent; and
receive one or more Simple Object Access Protocol alert notifications from the alert notification agent, the one or more alert notifications indicating a status of the managed object.

18. The system of claim 17, wherein creating a representation of the schema in the database comprises translating the schema into a representation compatible with the alert notification manager.

19. The system of claim 17, wherein registering the alert notification manager to receive alert notifications from the alert notification agent comprises sending a request to register the alert notification manager as recipient of alert notifications regarding the managed object.

20. The system of claim 19, wherein the request comprises one or more pieces of information selected from the group consisting of alert notification manager identification information, connection parameters, security credentials, and proxy server information.

21. The system of claim 17, wherein the alert notification manager is configured to record the one or more alert notifications in an agent behavior log.

22. The system of claim 17, wherein the alert notification manager is configured to send an email notification to a user in response to the alert notification.

23. A system for alert notification, comprising:
an alert notification manager residing on a processor-controlled device; and
a database operable to store information received from the alert notification manager;
wherein the alert notification manager is configured to:
use a discovery process to query an agent metadata service running on the agent device for metadata information residing on the agent, the metadata information comprising information about the managed object;
use the metadata information retrieved from the agent metadata service running on the agent device to identify an alert notification agent monitoring a managed object;
identify a schema associated with the alert notification agent monitoring;
create a representation of the schema in the database;
register to receive alert notifications from the alert notification agent; and
receive one or more Simple Object Access Protocol alert notifications from the alert notification agent, the one or more alert notifications indicating a status of the managed object, and
wherein the alert notification manager is configured to receive the one or more Simple Object Access Protocol alert notifications at predetermined intervals.

24. The system of claim 23, further comprising a management user interface residing on a management console, the management user interface operable to allow a user to configure the predetermined interval for the managed object, the predetermined interval defining a collection frequency for the alert notification agent.

25. The method of claim 1, further comprising providing a schema manager service associated with the alert notification manager on the processor-controlled device, the schema manager service operable to provide a façade over the repository to allow a user to add, delete, and update a plurality of agent schema objects.

26. The non-transitory storage medium of claim 9, further comprising program instructions operable when executed to provide a schema manager service associated with the alert notification manager on the processor-controlled device, the schema manager service operable to provide a façade over the repository to allow a user to add, delete, and update a plurality of agent schema objects.

27. The system of claim 17, further comprising a schema manager service associated with the alert notification manager on the processor-controlled device, the schema manager service operable to provide a façade over the repository to allow a user to add, delete, and update a plurality of agent schema objects.

* * * * *